United States Patent Office 3,555,058
Patented Jan. 12, 1971

3,555,058
CATALYTICALLY HYDROGENATING EDIBLE OILS
Louis H. Going, Deerfield Township, Warren County, Robert E. Mersfelder, Springfield Township, Hamilton County, and Robert O. Schmitt, Wyoming, Ohio, assignors to The Procter & Gamble Company, Cincinnati, Ohio, a corporation of Ohio
No Drawing. Filed Dec. 27, 1967, Ser. No. 693,751
Int. Cl. C11c 3/12
U.S. Cl. 260—409
4 Claims

ABSTRACT OF THE DISCLOSURE

Increased hydrogenation catalyst life results from filtering hydrogenation catalyst from catalyst containing edible oils in the substantial absence of oxygen and in the presence of an inert gas on a flexible filter medium. Catalyst is periodically dislodged from filter medium by back pressure created in an inert gas cushion and the filtered oil. Dislodged catalyst is then transferred from the filter medium as catalyst in oil slurry without exposure to air. Life of catalyst filtered by this method is further increased when concentration of oxygen, water, and free fatty acids in edible oils are reduced prior to hydrogenation.

BACKGROUND OF THE INVENTION

The field of this invention is catalytic hydrogenation of edible oils. In particular, this invention relates to improvements which increase hydrogenation catalyst life by inhibiting catalyst poisoning.

Hydrogenating an edible oil consists of the direct addition of hydrogen at double bonds in the fatty acid chains. It is a means of enhancing the stability and improving the color of oils, and of hardening oils to increase their solids content.

The reaction requires a catalyst; usually the catalyst is basically nickel, although minor amounts of copper, aluminum, etc., can be incorporated with the nickel for their "promoter" or selectivity action. Other catalysts include metals, alloys and compounds of, for example, chromium, cobalt, copper, iron, lead, manganese, mercury, molybdenum, palladium, platinum, thorium, titanium, vanadium, zinc and zirconium.

By far the greatest amount of commercial hydrogenation of edible oils is carried out with powder catalysts composed of the metal or metals in finely divided form. The catalyst is suspended in the oil before or during hydrogenation, and remains so afterwards. After hydrogenation, the catalyst is removed by filtration. Although catalysts are not consumed in the hydrogenation reaction, they are gradually deactivated or "poisoned" after a number of uses and must ultimately be discarded.

Hydrogenation catalyst, of whatever type, is prepared by precise, specialized methods, and is valuable material. It is therefore desirable to extend its useful life as long as practical. Moreover, in addition to the expense of replacing depleted catalyst, the quality of product must be carefully controlled, since partially poisoned catalyst yields an inferior hydrogenated oil.

The conventional process of catalytically hydrogenating an edible oil comprises sequential steps of adding a hydrogenation catalyst to the edible oil, hydrogenating the edible oil, and removing the hydrogenation catalyst from the edible oil. The hydrogenation catalyst is usually reused until it becomes sufficiently poisoned to warrant discarding it. The temperature of reaction typically varies between about 150° F. and 500° F.; and within this temperature range hydrogenation is usually carried out in the substantial absence of oxygen, whether to prevent deterioration or poisoning of the catalyst (see U.S. Pat. 1,285,960, granted Nov. 26, 1918, to C. Ellis), or to prevent explosion which can occur between oxygen and hydrogen at the reaction temperature.

Two distinct forms of oxygen which can have a deleterious effect upon catalyst during hydrogenation are recognized in the art. "Dissolved oxygen" is that which becomes associated with the oil when it is exposed to the air or other oxygen-containing material, and can comprise up to about 2% (by volume) of a typical edible oil at room temperature (about 70° F.). "Free oxygen" includes all oxygen which is in contact with the oil or catalyst but not dissolved in the oil. Hereinafter, the term "oxygen" refers to "free oxygen" unless designated "dissolved oxygen." It is known that it is undesirable to exclude both oxygen and dissolved oxygen from the catalyst prior to and during hydrogenation (U.S. Patent 1,285,960).

Thus, although the prior art recognizes certain procedures to avoid catalyst poisoning and thus increase catalyst life, further improvements in this area are desirable.

SUMMARY OF THE INVENTION

In view of the above-stated need to extend the useful life of hydrogenation catalyst, this invention provides, in the process of catalytically hydrogenating an edible oil comprising the sequential steps of adding a hydrogenation catalyst to the edible oil, hydrogenating the edible oil in the substantial absence of oxygen, removing the hydrogenation catalyst from the hydrogenated edible oil, and reusing the hydrogenation catalyst, the improvement for increasing catalyst life, which comprises removing the hydrogenation catalyst from the hydrogenated edible oil and reusing the removed hydrogenation catalyst in the substantial absence of oxygen.

Preferred embodiments of this invention which further extend catalyst life include the additional steps of decreasing the concentrations of dissolved oxygen, water, and free fatty acids in the edible oil to below about 0.1% by volume, about 0.05% and about 0.05%, respectively, prior to hydrogenation. All percentages in this specification, except of dissolved oxygen, are by weight, unless otherwise indicated. Dissolved oxygen percentages are by volume.

The advantage of reducing dissolved oxygen, water, and free fatty acid content to below the levels indicated, and particularly of removing and reusing the hydrogenation catalyst in the substantial absence of oxygen, is the increase in hydrogenation catalyst life (i.e., the reduction of catalyst poisoning) which is thereby obtained. This results in greater convenience and lower costs in hydrogenating edible oils, since the catalyst can be reused a greater number of times; moreover, the quality of the edible oils (fatty acid composition, melting characteristics, and degree of isomerization) is improved by using catalyst which is less poisoned.

DETAILED DISCLOSURE

The present invention is useful in catalytically hydrogenating edible oils, i.e., various substances of plant or animal origin which consist predominantly of glyceryl esters of fatty acids, especially triglycerides. Preferred oils are tallow, lard, and the common edible vegetable oils used for the production of salad oil and shortenings, e.g., cottonseed, safflower, palm, soybean, rapeseed, sunflower, corn and coconut oils. The invention is particularly applicable to the hydrogenation of soybean oil with nickel and/or copper catalyst.

The key step in this invention's improvement in increasing catalyst life is the removal, subsequent to hydrogenation, of catalyst from the hydrogenated edible oil and reuse of the removed catalyst in the substantial absence of oxygen. This step is preferably accomplished by means of the process of the copending, concurrently filed U.S. patent application of Louis H. Going, Robert E. Mersfelder, and Robert O. Schmitt, Ser. No. 693,865, now U.S. Patent No. 3,414,129, incorporated herein by reference. That application discloses a process for high temperature (150°–500° F.) edible oil filtration, which permits high speed filtration in the absence of oxygen, the convenient removal of filtered solids (e.g., hydrogenation catalyst) from the filter apparatus, and thus the reuse of the filtered solids, without exposure of the oil or filtered solids to air or water. Specifically, that application describes a process for filtering solids from an edible oil, which comprises:

(A) Introducing a flow of solids-containing oil at a temperature ranging from about 150° to about 500° F. into a gas-tight housing containing a flexible filter medium in the flow of oil and a cushion of inert gas downstream of the filter medium;

(B) Filtering the oil through the filter medium, thereby depositing the solids on the filter medium;

(C) Withdrawing filtered oil from the housing downstream of the filter medium;

(D) Periodically dislodging the deposited solids from the filter medium by (1) stopping the withdrawal until the pressure in the cushion increases (preferably to at least 30 p.s.i.g., but not greater than 100 p.s.i.g.), then (2) stopping the introduction, then (3) abruptly opening the housing on the upstream side of the filter medium thereby causing the filter medium to flex and dislodge the deposited solids; and (E) Removing the dislodged solids from the housing; the entire process being performed in the absence of oxygen.

Applying the above-described process to the present invention, filtered catalyst can be filtered from oil onto a filter medium, dislodged from the filter medium, removed from the filter, recovered (in the form of a concentrated slurry of catalyst in oil), and reused (by adding the slurry of catalyst in oil, to oil to be hydrogenated), all in the absence of oxygen.

The above-described filtration process is preferably accomplished with a tubular filter having a filter medium support member comprising an individual tube or several tubes which are covered with flexible filter medium comprising fabric. Further details concerning this filtration process, and a type of filter apparatus which can be used in it, are given in Example 1 below.

To obtain the maximum benefit from the process of this invention, it is important to exclude oxygen both during removal of the hydrogenation catalyst from the hydrogenated oil and during reuse of the catalyst, as well as at all times in between.

Conventional plate-and frame filters which are enclosed and blanketed in an inert gas cannot effectively be used to remove hydrogenation catalyst from hydrogenated oil in the substantial absence of oxygen, since there is no known method of economically removing and reusing the used catalyst from the filter without exposure to oxygen.

The preferred embodiments of this invention which include the additional steps of decreasing the concentrations of dissolved oxygen, water, and free fatty acids in the edible oil prior to hydrogenation are performed in combination with the above-described step of removal and reuse of catalyst in the substantial absence of oxygen. (It is to be noted that as used in this specification, the phrase "substantial absence of oxygen" does not require that dissolved oxygen be absent from the oil.) These additional steps can be individually combined with the step of removal and reuse of catalyst in the substantial absence of oxygen, but they are preferably combined with each other and with the removal and reuse step in order to optimize catalyst life.

The step of decreasing the concentration of free fatty acids in the edible oil to below about 0.05% prior to hydrogenation, can be accomplished by known techniques of "refining" or "neutralization," for example, by treating the edible oil with a basic material (e.g., sodium hydroxide, sodium carbonate, or mixtures thereof), or by other methods for removing or reducing free fatty acids in edible oils which are known in the art. See U.S. Patent 3,102,898, granted Sept. 3, 1963, to R. O. Schmitt; see also F. A. Norris, in D. Swern, ed., Bailey's Industrial Oil and Fat Products, pages 719–92 (John Wiley & Sons, 3d Ed. 1964). A preferred method of decreasing the concentration of free fatty acids in the edible oil to below about 0.05% is described in the above-mentioned U.S. Patent 3,102,898, and comprises the steps of continuously adding to a stream of oil a sodium carbonate solution containing a controlled amount of sodium hydroxide to neutralize the free fatty acid and form soap or foots therefrom, subjecting the oil and alkalies to at least a short period of mixing above a minimum intensity, holding the oil with or without further mixing of either high- or low-intensity until the reaction is sufficiently complete, and centrifuging the mixture to separate the refined oil from the foots.

The step of decreasing the concentration of dissolved oxygen in the edible oil to below about 0.1% by volume, prior to hydrogenation, can be accomplished by subjecting the heated oil to a partial vacuum in a closed container, as more fully described below. Alternatively, dissolved oxygen can be removed from the oil by sparging, i.e., bubbling inert gas such as nitrogen through the oil.

The step of decreasing the concentration of water in the edible oil below 0.05%, prior to hydrogenation, can be accomplished by subjecting the heated oil to a partial vacuum in a closed container, as more fully described below. Alternatively, water can be removed from the oil by passing the oil through a column containing a substance (such as sodium aluminum silicate, activated alumina, or silica gel) which adsorbs or otherwise removes water.

Preferably, the concentrations of both dissolved oxygen and water are simultaneously decreased to below 0.1% by volume and 0.05% by weight, respectively, prior to hydrogenation, by heating the edible oil and subjecting the heated oil to a partial vacuum in a closed container. This can be done after a refining step, since the refining process usually saturates the oil with water. The temperature to which the oil is heated should not be so high as to damage the oxygen-containing and water-containing oil. For example, soybean oil which is saturated with air and water at room temperature (about 70° F.) contains about 0.2% water (by weight) and 2.0% dissolved oxygen (by volume). This oil can safely be heated to about 220° F. without degradation. With this limitation, however, oils are more quickly dried and deaerated at high temperatures.

In order to dry and deaerate an oil in a closed container, three conditions must be met. First, the temperature of the oil must be greater than the water vapor saturation temperature at the total pressure in the container. In other words, the absolute pressure in the container must be less than the vapor pressure of water at the temperature of the oil. Second, either the vapor in the space above the oil must not be saturated with water vapor, or if it is saturated, the vapor must be removed continuously. Third, sufficient time must be allowed for the dissolved air and water to flash from the oil. The time required depends on a number of variables, but can be reduced by decreasing the viscosity of the oil (e.g., by heating) and by increasing the surface area per unit volume of oil in the container (e.g., by spraying the oil into the dryer).

Preferred conditons for simultaneously decreasing the concentrations of dissolved oxygen and water in the edible oil to below about 0.1% by volume and to below 0.05% by weight, respectively, prior to hydrogenation, comprise (1) heating the oil to be deaerated and dried to a temperature of about 220° F., and (2) passing the oil through a gas-tight container from which water vapor and oxygen are continuously removed by a vacuum pump, so that the absolute pressure within the container is about 2.5 inches of mercury. Oil is preferably distributed on the inside surfaces of the container, so that in draining down the sides, sufficient time is consumed to allow the dissolved air (including dissolved oxygen) and water to flash from the oil.

The hydrogenation process itself can be carried out in the cnventinal manner, in either a continuous or batch process. See, for example, Bailey's Industrial Oil and Fat Products, supra, pp. 793–896. In a conventional continuous process, for example, there are introduced into a gas-tight, oxygen-free housing, (1) a flow of unhydrogenated oil, at a temperature of about 150° F. to 500° F.; (2) deoxygenated hydrogen; and (3) hydrogenation catalyst. The amount of hydrogenation catalyst can be varied to yield the desired amount of hydrogenation, depending on the degree of catalyst poisoning. After a sufficient residence time, hydrogenated oil and catalyst are withdrawn from the hydrogenation unit, and filtered.

The process of this invention is illustrated in the following examples.

EXAMPLE 1

This example illustrates the beneficial effect on catalyst life of removing the catalyst from the hydrogenated edible oil and reusing the catalyst in the substantial absence of oxygen.

Refined and bleached soybean oil containing about 0.05% by weight of water, about 0.05% by weight of free fatty acids, and about 0.2% dissolved oxygen, was hydrogenated in the substantial absence of oxygen in a continuous hydrogenation unit. Oil was passed through the unit at a temperature of about 300° F., at a rate of about 180 pounds of oil per hour, using a feed pressure on the oil of about 40 to 41 p.s.i.g. Hydrogen was added at a rate of about 110 standard cubic feet per hour, an excess of about 45% over that required to obtain an iodine value of 107. For various degrees of poisoning of nickel catalyst, various concentrations of catalyst were required to produce an oil which had an iodine number of 107; the concentrations of catalyst required to reach this point were measured, and taken as an indication of the degree to which the catalyst used had been poisoned. Thus, hydrogenation catalyst was added to the hydrogenation unit at varying rates, so that the concentration of catalyst was varied to obtain a constant iodine number, representing the degree of hydrogenation.

Two series of tests were run, using differing methods of removing the nickel catalyst from the hydrogenated oil. In each case, the oil was hydrogenated in the substantial absence of oxygen to an iodine value of 107, and the concentration of catalyst in the oil was measured before filtration. The filtered catalyst was then recovered and reused.

In the first series of tests, the catalyst had been used 0 to 4 times previously, respectively, in each of five runs. The catalyst was removed from the hydrogenated oil with a conventional plate-and-frame filter in which the unfiltered oil and catalyst were open to the air.

In the second series of tests, the catalyst had been used 0 to 6 times previously, respectively, in each of seven runs. The catalyst was removed from the hydrogenated oil by the process of the copending concurrently filed U.S. patent application of Going, Mersfelder, and Schmitt, Ser. No. 693,865, now U.S. Pat. No. 3,414,129, and reused in the substantial absence of oxygen. Specifically, the filtration was carried out as follows: The filter apparatus used comprised (1) a gas-tight, oxygen-free housing having (a) an inlet valve, through which unfiltered oil entered an inlet chamber of the filter apparatus, (b) an outlet valve, through which filtered oil left an outlet chamber of the filter apparatus, and (c) a solids discharge valve in the inlet chamber, through which filtered solids were removed from the inlet chamber of the filter apparatus; (2) a dividing and filtering member positioned within the housing between the inlet chamber and the outlet chamber, and comprising (a) a perforated tubular filter medium support member and (b) a Dacron flexible filter medium upon which filtered catalyst was deposited, said flexible filter medium covering the perforations in the tubular filter medium support member; and (3) a cushion of nitrogen within the outlet chamber, supplied via a gas inlet valve in the outlet chamber.

Filtration was accomplished by (A) passing a flow of the catalyst-containing (unfiltered) hydrogenated oil at a temperature of about 250° F. to 270° F. through the filter apparatus described above; (B) closing the outlet valve but leaving the inlet valve open, until an increase pressure in excess of about 50 p.s.i.g. was obtained in the cushion of nitrogen; (C) closing the inlet valve while maintaining the increased pressure; and (D) abruptly opening the solids discharge valve, thereby allowing the pressure in the inlet chamber to drop to about 0 p.s.i.g., causing the compressed cushion of nitrogen to expand and force oil from the outlet chamber, through the perforated tubular filter medium support member and Dacron flexible filter medium, and into the inlet chamber, whereby the flexible filter medium flexed and the filtered catalyst was dislodged therefrom, and simultaneously said filtered catalyst was removed from the inlet chamber of the filter apparatus; all in the substantial absence of oxygen.

The filtered catalyst, in the form of a slurry in oil, was collected in a solids collection tank which had been purged of oxygen by passing nitrogen through the tank. This slurry of catalyst in oil was then fed into the hydrogenation unit, along with unhydrogenated oil, and the catalyst was thus reused without exposure to oxygen. The concentration of catalyst in the slurry of oil was about 1.5% by weight, but higher concentrations can be obtained, for example, by recycling the collected slurry through the filter apparatus so that the slurry is refiltered and thereby concentrated. Slurries with catalyst concentrations ranging from about 1% to about 8% by weight are obtainable by this method, and such slurries can be pumped from the solids collection tank to the hydrogenation unit for reuse.

After hydrogenation, but prior to filtration, the following concentrations of catalyst were observed in the hydrogenated oil:

| Number of previous catalyst usages | Catalyst usage (percent nickel by weight), measured by amount of catalyst necessary to hydrogenate soybean oil to iodine value 107 | |
|---|---|---|
| | First series (Filtration with catalyst exposed to atmosphere) | Second series (Filtration and reuse in substantial absence of oxygen) |
| 0 | 0.060 | 0.060 |
| 1 | 0.090 | 0.071 |
| 2 | 0.120 | 0.078 |
| 3 | 0.150 | 0.081 |
| 4 | 0.180 | 0.075 |
| 5 | (¹) | 0.086 |
| 6 | (¹) | 0.088 |

¹ No observation.

After 5 usages of the catalyst filtered in the presence of air, the catalyst was deemed sufficiently poisoned as to be no longer useful, due to the difficulty in handling the increased amount of catalyst and to the inferior product obtained with oil poisoned to this extent. Specifically, the fatty acid composition, melting characteristics, and degree of isomerization were adversely affected. On the other hand, the quality of the oil filtered in the absence of oxygen was acceptable even after 7 catalyst usages.

The above example shows an increase in catalyst life of over 100%, taking into account both the decreased concentrations of catalyst required to obtain an iodine value of 107 and the increased number of times the catalyst could be used (5 vs. 7). This increase is calculated as follows: The first series' average catalyst usage was 0.120%; the second series' average catalyst usage was 0.077%. The catalyst of the first series could be used 5 times, yielding an average catalyst consumption of 0.024% by weight of the oil, for each hydrogenation. The catalyst of the second series could be used 7 times, yielding an average catalyst consumption of 0.011% by weight of the oil, for each hydrogenation. Hence the catalyst life of the catalyst of the second series was about 24/11, or about 218%, of the catalyst life of the first series. This increased life is the result of removing the hydrogenation catalyst from the hydrogenated edible oil and reusing it in the substantial absence of oxygen.

EXAMPLE 2

This example illustrates the additional benefit to be obtained by decreasing the dissolved oxygen concentration in the unhydrogenated oil, in combination with removing the hydrogenation catalyst from the hydrogenated edible oil and reusing the removed catalyst in the substantial absence of oxygen.

Refined and bleached soybean oil containing about 0.05% of water and about 0.05% of free fatty acids was hydrogenated to an iodine value of 107 as in Example 1. In this example, however, all of catalyst was removed and reused, as well as the oil being hydrogenated, in the substantial absence of oxygen, as in the second series of tests of Example 1.

In two series of tests, oils containing 1.21% and 0.08% dissolved oxygen by volume, respectively, were hydrogenated with each of four conditions of catalyst which had been used 0 to 3 times previously, respectively. The dissolved oxygen concentrations were measured with a Beckman 778 Oxygen Analyzer.

The following concentrations of catalyst were required to obtain an iodine value of 107:

| Number of previous catalyst usages | Catalyst usage (percent nickel by weight) for indicated dissolved oxygen concentration (by volume) | |
|---|---|---|
| | 1.21% $O^2$ | 0.08% $O^2$ |
| 0 | 0.051 | 0.051 |
| 1 | 0.083 | 0.069 |
| 2 | 0.105 | 0.078 |
| 3 | 0.132 | 0.096 |

This example shows that when the concentration of dissolved oxygen in the unhydrogenated oil is reduced to less than about 0.1% by volume in addition to removing the hydrogenation catalyst from the unhydrogenated edible oil and reusing it in the substantial absence of oxygen, a further increase in catalyst life is obtained.

EXAMPLE 3

Example 3 illustrates the effect of water in the unhydrogenated oil on catalyst life. Three portions of refined and bleached soybean oil containing various amounts of water were hydrogenated to an iodine value of 107, and the catalyst was removed in the substantial absence of oxygen, as in the previous examples, but using only fresh nickel catalyst. The concentrations of dissolved oxygen and free fatty acids in the oil were about 0.2% by volume and about 0.05% by weight, respectively. The concentrations of catalyst required to obtain an iodine value of 107 were as follows:

| Concentration of water in unhydrogenated oil, percent: | Concentration of catalyst required, percent |
|---|---|
| 0.034 | 0.048 |
| 0.080 | 0.056 |
| 0.120 | 0.063 |

This example shows that when the concentration of water is reduced to less than about 0.05% by weight, a substantial decrease in catalyst required is noted. When this step is combined with the improvement of removing and reusing the hydrogenation catalyst in the substantial absence of oxygen, catalyst life is substantially improved as compared to that observed when hydrogenation catalyst is removed and reused in the substantial absence of oxygen, but when the water concentration in the unhydrogenated oil is not controlled within the above-mentioned limit.

EXAMPLE 4

Example 4 illustrates the effect of free fatty acid on the unhydrogenated oil on catalyst life. Three portions of refined and bleached soybean oil containing various amounts of free fatty acids were hydrogenated to an iodine value of 107, and the catalyst was removed in the substantial absence of oxygen, as in the previous examples, but using only fresh nickel catalyst. The concentrations of dissolved oxygen and water in the oil were about 0.2% by volume and about 0.05% by weight, respectively. The concentrations of catalyst required to obtain this value were as follows:

| Concentration of free fatty acids in unhydrogenated oil, percent: | Concentration of catalyst required, percent |
|---|---|
| 0.03 | 0.050 |
| 0.14 | 0.063 |
| 0.45 | 0.078 |

This example shows that when the concentration of free fatty acid is reduced to less than about 0.05% by weight, a substantial decrease in catalyst required is noted. When this step is combined with the improvement of removing and reusing the hydrogenation catalyst in the substantial absence of oxygen, catalyst life is substantially improved as compared to that observed when hydrogenation catalyst is removed and reused in the substantial absence of oxygen, but when free fatty acid concentration in the unhydrogenated oil is not controlled within the above-mentioned limit.

What is claimed is:

1. In the process of catalytically hydrogenating an edible oil which includes the sequential steps of: (A) adding a hydrogenation catalyst to the edible oil, (B) hydrogenating the edible oil in the substantial absence of oxygen, (C) filtering the edible oil to remove the hydrogenation catalyst from the hydrogenated edible oil, and (D) reusing the filtered hydrogenation catalyst, the improvement in the filtering step (C) comprising:
   (I) introducing a flow of catalyst-containing oil at a temperature ranging from about 150° to about 500° F. into a gastight housing containing a flexible filter medium in the flow of oil and a cushion of inert gas downstream of the filter medium;
   (II) filtering the oil through the filter medium, thereby depositing the catalyst on the filter medium;
   (III) withdrawing the filtered oil from the housing downstream of the filter medium;
   (IV) periodically dislodging the deposited catalyst from filter medium by
      (1) stopping the withdrawal until the pressure in the cushion increases, then
      (2) stopping the introduction, then
      (3) abruptly opening the housing on the upstream side of the filter medium thereby causing the filter medium to flex and dislodge the deposited catalyst; and
   (V) removing the dislodge catalyst from the housing in the form of a concentrated slurry of catalyst in oil.

2. The process of claim 1 wherein the amount of dissolved oxygen in the edible oil to be hydrogenated is reduced to less than about 0.1% by volume.

3. The process of claim 1 wherein the amount of water in the edible oil to be hydrogenated is reduced to less than about 0.05% by weight.

4. The process of claim 1 wherein the amount of free fatty acids in the edible oil to by hydrogenated is reduced to less than about 0.05% by weight.

References Cited
UNITED STATES PATENTS

| | | | |
|---|---|---|---|
| 3,102,989 | 9/1963 | Schmitt | 260—425 |
| 2,980,717 | 4/1961 | Raffaeta | 260—428 |
| 2,875,220 | 2/1959 | Bremer | 260—409 |
| 2,508,919 | 5/1950 | Jakobsen | 260—428 |
| 1,285,960 | 11/1918 | Ellis | 260—409 |
| 1,276,509 | 8/1918 | Ellis | 260—409 |
| 2,014,999 | 9/1935 | Barradas | 260—409 |

LEWIS GOTTS, Primary Examiner

C. L. MILLS, Assistant Examiner